United States Patent [19]
Luniewski

[11] Patent Number: 5,149,727
[45] Date of Patent: Sep. 22, 1992

[54] IRRADIATION DEVICE FOR FLUOROPOLYMERS

[75] Inventor: Robert S. Luniewski, Smithtown, N.Y.

[73] Assignee: Medical Sterilization, Inc., Syosset, N.Y.

[21] Appl. No.: 485,284

[22] Filed: Feb. 26, 1990

[51] Int. Cl.$^5$ ............................................... C08J 3/28
[52] U.S. Cl. ................................. 522/156; 241/79.1; 241/79; 209/133
[58] Field of Search ................. 522/156; 241/79.1, 79; 209/133

[56] References Cited

U.S. PATENT DOCUMENTS

| | | | |
|---|---|---|---|
| 3,434,593 | 3/1969 | Sullivan | 204/139.2 |
| 3,718,819 | 2/1973 | Miksitz | 250/358.1 |
| 4,210,511 | 9/1980 | Derbyshire | 522/4 |
| 4,777,192 | 10/1988 | Neuberg | 522/156 |

Primary Examiner—John Niebling
Assistant Examiner—Arun S. Phasge
Attorney, Agent, or Firm—Kane, Dalsimer, Sullivan, Kurucz, Levy, Eisele and Richard

[57] ABSTRACT

A method and apparatus for the simultaneous irradiation, grinding, agitation and air cooling of fluoropolymers, such as polytetrafluoroethylene, produce dry lubricants. An air classifier is used to extract particles of a uniform size during the process.

19 Claims, 2 Drawing Sheets

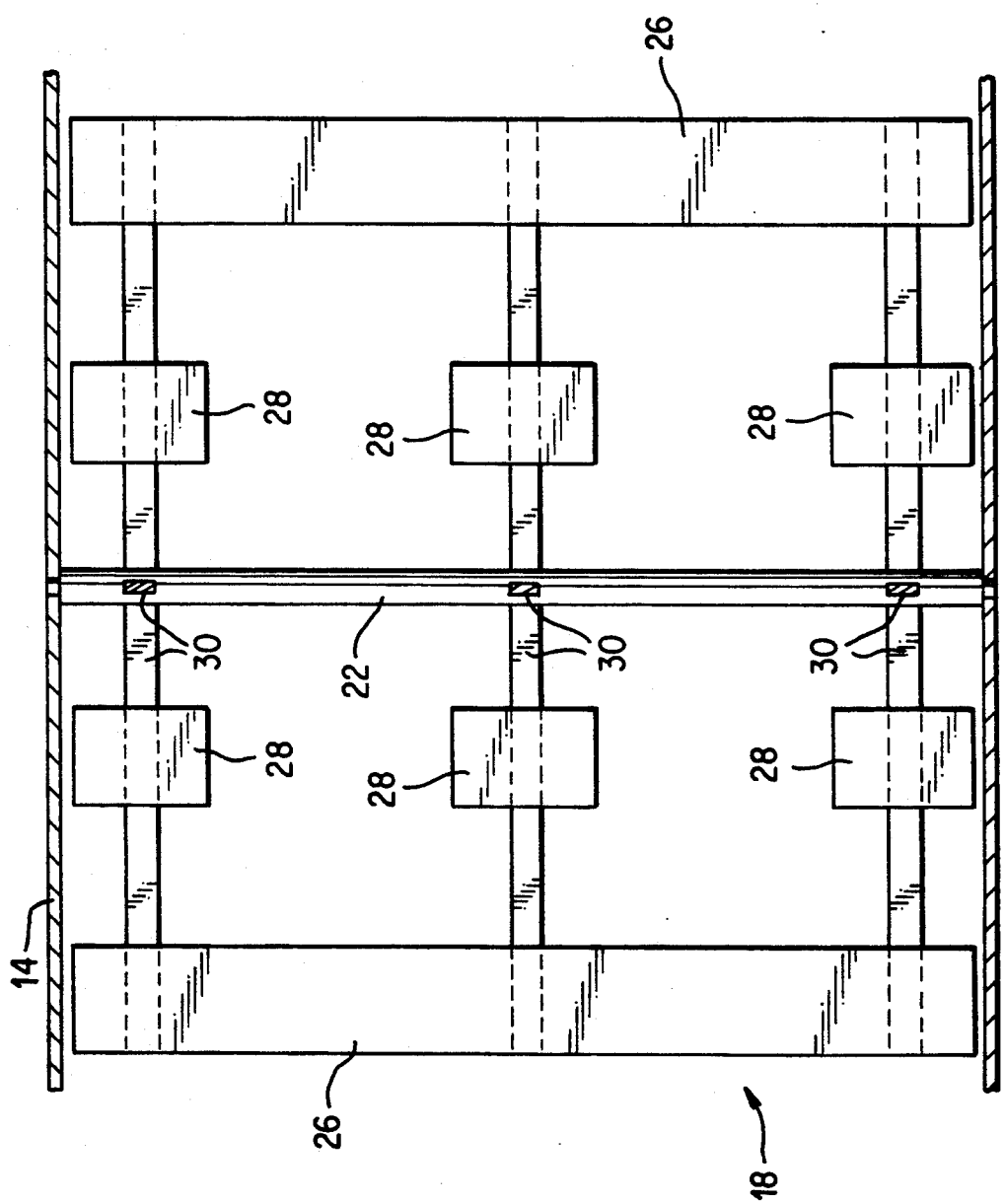

IRRADIATION DEVICE FOR FLUOROPOLYMERS

BACKGROUND OF INVENTION

1. Field of Invention

This invention relates to the use of electron irradiation and grinding along with an air classifier for the degradation of fluoropolymers, particularly polytetrafluoroethylene, to a uniform size and corresponding reduced molecular weight.

2. Description of the Prior Art

It is well-known in the prior art to use electron irradiation to degrade polytetrafluoroethylene (PTFE) so as to reduce its molecular weight resulting in a fine particle powder for use as a dry lubricant in paints and ink.

An early example of such a process is disclosed in U.S. Pat. No. 3,766,031 to Dillon wherein PTFE was exposed to electron irradiation. This process, however, was deficient in that there was no cooling apparatus and the PTFE was not irradiated uniformly.

The irradiation processes of the early prior art which irradiated the PTFE in trays were inefficient due to overscan of the trays, the gaps between the trays and the penetration characteristics of an electron beam. That is, the need to assure complete and uniform irradiation of a tray requires some overscan by the radiation and an efficiency loss of 5 to 15%. Likewise, there is usually some space between the trays of material which causes a further 10 to 15% loss of efficiency. However, the largest efficiency loss arises out of the fact that the dose received by the material varies with material depth. Typically, the dose at the surface is taken as the nominal dose for the material. Beam energy and/or material depth is adjusted so that an equal dose is effected at the opposite surface of the material. Radiation which passes entirely through the product is not utilized. Radiation in excess of the nominal dose is likewise not used. This causes further inefficiency, and in some instances may result in undesired properties of the resultant product. This depth-dose characteristic can cause processing inefficiency of up to 50%.

U.S. Pat. Nos. 4,748,005 and 4,777,192 issued to Neuberg and the instant inventor disclose water cooling, either with a water jacket or by direct spraying onto the PTFE, during electron irradiation of a selected portion of the PTFE while in a processing vessel. These processes result in a uniformly irradiated product. However, the uniformly irradiated product is of poor quality in that the resulting powder particles are of widely varying sizes and is not cost effective in that particles which are mechanically comminuted to a small size need less radiation than do other particles.

These references are designed for batch operation, which adds to the energy and economical inefficiency.

These references use a ribbon blender which requires large energy expenditures. Further, the apparatus of these references tended to fluidize PTFE. Additionally, the use of direct water cooling prevents proper degradation of the PTFE resulting in an inferior product. The use of direct water cooling also results in a great quantity of waste steam which contains fluorine gas, which combines with water to form hydrofluoric acid. Similarly, the use of a water jacket raises the concern that the water should be supplied at a temperature which is above the dew point of the surrounding air to avoid condensation. This may lead to the use of large quantities of water at elevated temperatures, and even the use of a water-to-water heat exchanger which adds to the complexity of the apparatus.

OBJECTS AND SUMMARY OF THE INVENTION

It is therefore an object of this invention to degrade fluoropolymers, especially polytetrafluoroethylene, by the use of electron irradiation and grinding to produce polytetrafluoroethylene particles of reduced molecular weight within a preselected size range.

It is therefore a further object of this invention to use energy efficiently, both in the efficient use of the electron beam and in the means of physical agitation of the PTFE.

It is therefore a further object of this invention not to fluidize the PTFE during the grinding and irradiation process.

It is therefore a final object of this invention to use air cooling, rather than water cooling, during the irradiation process.

These and other objects are effectively attained by providing an apparatus and method using paddles within an irradiation and grinding vessel to agitate the PTFE stock in a haphazard random manner, passing at least a portion of the PTFE through the zone of irradiation of an electron beam. A high pressure air manifold is provided at the bottom of the irradiation and grinding vessel to effect grinding simultaneously with the irradiation. Intermediate air pressure manifolds are provided near the top of the vessel to cool the particles and to increase further the haphazard random motion of the PTFE particles and to provide the pressure differential necessary to urge the particles toward an air classifier. The air classifier balances centrifugal force and air drag to extract particles from the processing container within a pre-selected diameter range on the order of ten microns and within a corresponding pre-selected molecular weight range.

Therefore, an apparatus and method are provided for the reduction of particle size and molecular weight by simultaneous grinding and irradiation of fluoropolymers such as PTFE for use as a dry lubricant.

This apparatus and method are energy efficient in that the electron irradiation is essentially completely absorbed in the PTFE, and no particles continue to receive irradiation after being extracted by the air classifier due to their desired size and corresponding molecular weight. Similarly, this apparatus and method are energy efficient in that paddles are used for agitation rather than a high speed ribbon blender. This apparatus and method are economically efficient in that it is not constrained to batch operation and can have a continuous feed.

The product produced by this method and apparatus is superior due to the uniform size and molecular weight of the resultant particles and due to the lack of water cooling.

BRIEF DESCRIPTION OF THE DRAWINGS

FIG. 2 shows an upper cross-sectional view, partly in elevation, of the paddle assembly of the present invention.

DETAILED DESCRIPTION OF THE PREFERRED EMBODIMENT

Figure 1:
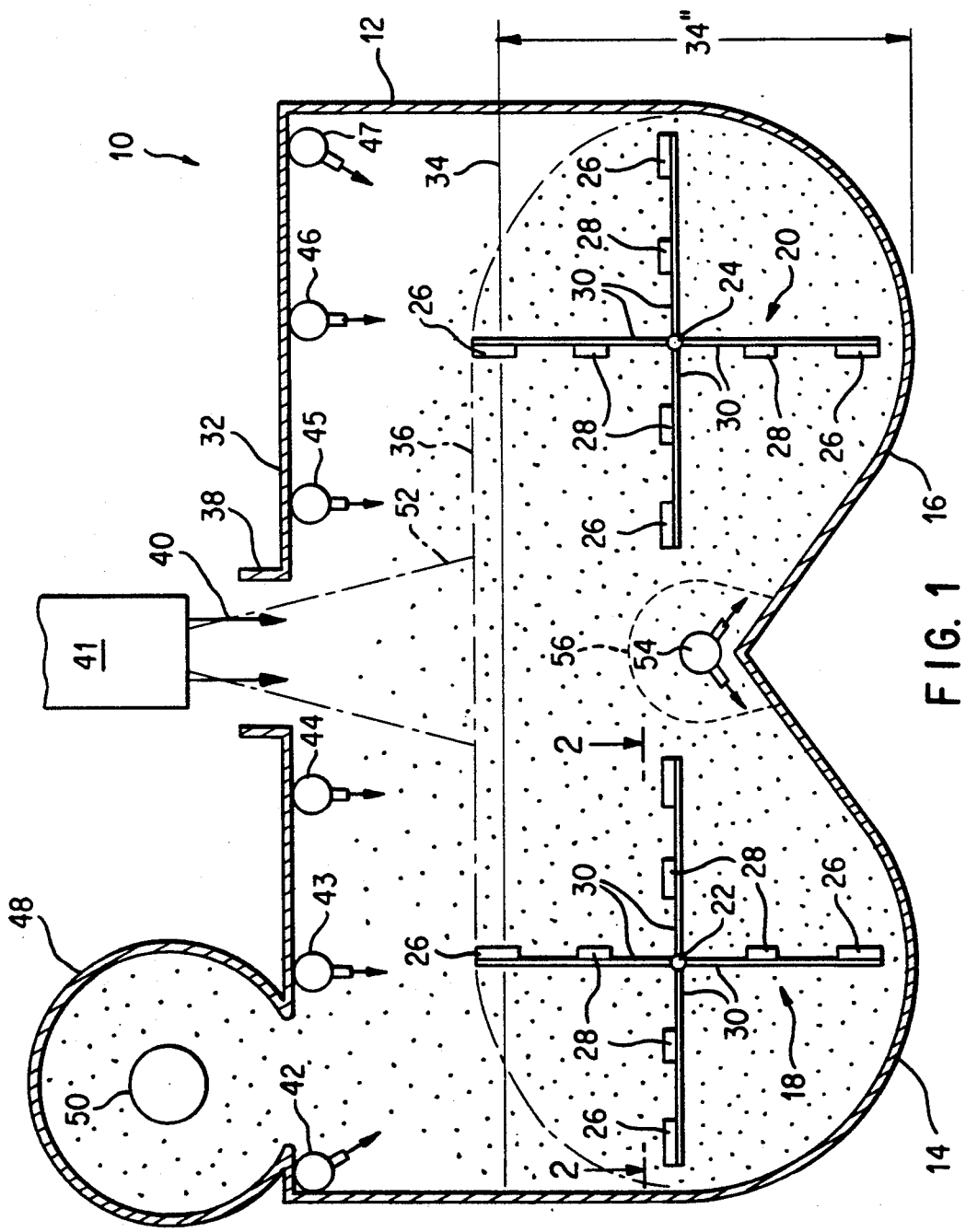
FIG. 1 shows a cross-sectional view of the apparatus of the present invention.

Referring now to the drawings in detail wherein like numerals refer to like elements throughout the several views, apparatus 10 includes an irradiation and grinding vessel 12 with two wells 14, 16 which conform to the circular paths of paddle assemblies 18, 20 so as to resemble the lower portion of an inverted heart shape. Paddle assemblies 18, 20 are journalled for rotation on axles 22, 24. As shown in more detail in FIG. 2, paddle assembly (which is denominated "18" in FIG. 2, but is equally applicable to "20") includes radial arms 30 which extend from axle 22 to outer paddles 26 and support inner paddles 28. In all, each paddle assembly 18 and 20 includes twelve radial arms 30, four outer paddles 26 and twelve inner paddles 28.

Vessel 12 includes a cover 32 into which the PTFE is loaded to the quiescent level 34. The rotation of the paddle assemblies 18, 20 cause the level of the PTFE to conform generally to contour 36.

In the center of the top of vessel 12 is the aperture 38 through which electron beam 40 from electron beam apparatus 41 projects. The top of vessel 12 further includes air manifolds 42, 43, 44, 45, 46 and 47 and air classifier 48 which includes air outlet 50. The air classifier balances centrifugal force and air drag to extract particles from vessel 12 in the diameter range of approximately 10 microns. In this manner, particles of a uniform size and molecular weight, some with a high irradiation history but with a low grinding history, others with the reverse, are collected by the air classifier.

Paddle assembly 18 rotates counterclockwise (with respect to the orientation shown in FIG. 1) while paddle assembly 20 rotates clockwise so as to project the PTFE haphazardly and randomly into irradiation zone 52 of electron beam apparatus 41. As a cloud of PTFE material is generated within irradiation zone 52, the electron beam is essentially absorbed within the cloud and within the bed of PTFE as indicated by level 36. This results in very efficient use of the electron beam which is not present in the prior art references.

Simultaneously, air manifold 54 at the apex of wells 14 and 16, injects high pressure air (preferably between 7 and 25 psi) into the vessel 12 in a direction opposite to the rotation of paddle assemblies 18, 20 thereby effecting grinding of the PTFE particles within grinding zone 56 and contributing to the haphazard random motion of the particles of PTFE into the irradiation zone 52. Air manifolds 42-47 inject air up to 200 psi into the vessel 12 which cools the PTFE to below the PTFE melting point of 620° F. thereby precluding the need for water cooling. The use of air cooling does not fluidize ("fluidize" being defined as being made to have a zero angle of repose) the PTFE particles. Moreover, the air injected by air manifolds 42-47 further contributes to the grinding and to the haphazard and random motion of the PTFE particles and urges the PTFE particles to the negative pressure vented air classifier 48 and air outlet 50 where PTFE particles of a reduced molecular weight and of a diameter of approximately ten microns are extracted. The length of operation is typically four to nine hours, but could be indefinite in the case of continuous feed operation.

Additionally, if it is desired to reach a smaller size of PTFE particle (for instance, 3.5 microns), the PTFE particles which were extracted from the vessel 12 by classifier 48 may be reinserted into the vessel and reprocessed with the electron beam apparatus 41 turned off and grinding effected by paddle assemblies 18, 20, air manifold 54, and air manifolds 42-47.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. Apparatus for radiation processing of polytetrafluoroethylene comprising:
   an irradiation vessel;
   an irradiation source providing an electron beam within said irradiation vessel;
   means within said irradiation vessel to agitate the polytetrafluoroethylene, said agitating means urging the polytetrafluoroethylene particles to move randomly and haphazardly; and
   means for extracting particles of polytetrafluoroethylene of a preselected diameter/molecular weight range from said irradiation vessel during operation of said irradiation source.

2. The apparatus of claim 1 further including means within said irradiation vessel to grind the polytetrafluoroethylene.

3. Apparatus for radiation processing of polytetrafluoroethylene comprising:
   an irradiation vessel;
   an irradiation source providing an electron beam within said irradiation vessel;
   means within said irradiation vessel to agitate the polytetrafluoroethylene, said agitating means urging the polytetrafluoroethylene particles to move randomly and haphazardly;
   an air manifold within said irradiation vessel to grind the polytetrafluoroethylene; and
   means for extracting particles of polytetrafluoroethylene of a preselected diamter/molecular weight range from said irradiation vessel during operation of said irradiation source.

4. Apparatus for radiation processing of polytetrafluoroethylene comprising:
   an irradiation vessel;
   an irradiation source providing an electron beam within said irradiation vessel;
   means within said irradiation vessel to agitate the polytetrafluoroethylene;
   means for extracting particles of polytetrafluoroethylene of a preselected diameter/molecular weight range from said irradiation vessel during operation of said irradiation source; and
   means for injecting air into the vessel to cool the polytetrafluoroethylene below a melting point of the same.

5. Apparatus for radiation processing of polytetrafluoroethylene comprising:
   an irradiation vessel;
   an irradiation source providing an electron beam within said irradiation vessel;
   means within said irradiation vessel comprising at least one rotating paddle to agitate the polytetrafluoroethylene; and
   means for extracting particles of polytetrafluoroethylene of a preselected diameter/molecular weight range from said irradiation vessel during operation of said irradiation source.

6. The apparatus of claim 5 wherein said agitating means comprises two oppositely rotating paddles with substantially parallel axes of rotation, said oppositely rotating paddles projecting the polytetrafluoroethylene into an irradiation zone of said irradiation source.

7. The apparatus of claim 6 wherein said oppositely rotating paddles have horizontal axes of rotation; wherein a lower surface of said processing vessel comprises two wells conforming to paths of said paddles with an apex formed therebetween; and wherein said grinding means comprises an air manifold on said apex injecting air in a direction opposing rotation of said paddles.

8. Apparatus for radiation processing of polytetrafluoroethylene comprising:
   an irradiation vessel;
   an irradiation source providing an electron beam within said irradiation vessel;
   means within said irradiation vessel to agitate the polytetrafluoroethylene, said agitating means urging the polytetrafluoroethylene particles to move randomly and haphazardly; and
   an air classifier for extracting particles of polytetrafluoroethylene of a preselected diameter/molecular weight range from said irradiation vessel during operation of said irradiation source;
   wherein said agitating means comprises two oppositely rotating paddles with substantially parallel horizontal axes of rotation, said oppositely rotating paddles projecting the polytetrafluoroethylene into an irradiation zone of said irradiation source;
   wherein a lower surface of said irradiation vessel comprises two wells conforming to paths of said paddles with an apex formed therebetween; and
   wherein said grinding means comprises an air manifold on said apex injecting air in a direction opposing rotation of said paddles.

9. The apparatus of claim 8 wherein said air classifier extracts particles of a diameter of approximately 10 microns.

10. Apparatus for radiation processing of polytetrafluoroethylene comprising:
    an irradiation vessel;
    an irradiation source providing an electron beam within said irradiation vessel;
    means within said irradiation vessel to agitate the polytetrafluoroethylene, said agitating means urging the polytetrafluoroethylene particles to move randomly and haphazardly; and
    an air classifier for extracting particles of polytetrafluoroethylene of a preselected diameter/molecular weight range from said irradiation vessel during operation of said irradiation source.

11. The apparatus of claim 8 wherein said air classifier extracts particles of a diameter of approximately 10 microns.

12. Apparatus for radiation processing of polytetrafluoroethylene comprising:
    an irradiation vessel;
    an irradiation source providing an electron beam within said irradiation vessel;
    means within said irradiation vessel to agitate the polytetrafluoroethylene, said agitating means urging the polytetrafluoroethylene particles to move randomly and haphazardly; and
    means for extracting particles of polytetrafluoroethylene of a preselected diameter/molecular weight range from said irradiation vessel during operation of said irradiation source;
    wherein the apparatus is free of water cooling means.

13. A method of radiation processing of polytetrafluoroethylene comprising the steps of:
    irradiating the polytetrafluoroethylene in an irradiation vessel with an electron beam;
    agitating the polytetrafluoroethylene simultaneously with said irradiating step, wherein said agitating step urges the polytetrafluoroethylene particles to move randomly and haphazardly;
    extracting particles of polytetrafluoroethylene within a preselected diameter/molecular weight range from said irradiation vessel simultaneously with said irradiating step.

14. The method of claim 13 further comprising the step of grinding the polytetrafluoroethylene simultaneously with said irradiation step.

15. The method of claim 13 wherein said extracting step is performed by an air classifier.

16. The method of claim 13 wherein said preselected diameter range is substantially 10 microns.

17. The method of claim 14 wherein said grinding step includes the step of using an air manifold.

18. The method of claim 13 which is free of a water cooling step.

19. A method of radiation processing of polytetrafluoroethylene comprising the steps of:
    irradiating the polytetrafluoroethylene in an irradiation vessel with an electron beam;
    injecting air into the irradiation vessel to cool the polytetrafluoroethylene;
    agitating the polytetrafluoroethylene simultaneously with said irradiating step;
    extracting particles of polytetrafluoroethylene within a preselected diameter/molecular weight range from said irradiation vessel simultaneously with said irradiating step.

* * * * *

UNITED STATES PATENT AND TRADEMARK OFFICE
CERTIFICATE OF CORRECTION

PATENT NO. : 5,149,727
DATED : September 22, 1992
INVENTOR(S) : Robert S. Luniewski It is certified that error appears in the above-identified patent and that said Letters Patent is hereby corrected as shown below:

On the title page: Item [73] Assignee's

"Assignee: Medical Sterilization, Inc.
Syosset, N.Y."

should be removed - this patent has not been assigned.

Signed and Sealed this

Twenty-sixth Day of October, 1993

*Attest:*

BRUCE LEHMAN

*Attesting Officer*   *Commissioner of Patents and Trademarks*